United States Patent
Eckl et al.

(10) Patent No.: US 11,755,353 B2
(45) Date of Patent: Sep. 12, 2023

(54) METHOD FOR RECIPROCALLY INTEGRATING APPLICATIONS, IN PARTICULAR WEB APPLICATIONS

(71) Applicant: SIEMENS AKTIENGESELLSCHAFT, Munich (DE)

(72) Inventors: Roland Eckl, Forchheim (DE); Claudio Carlucci, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/764,928

(22) PCT Filed: Nov. 5, 2018

(86) PCT No.: PCT/EP2018/080153
§ 371 (c)(1),
(2) Date: May 18, 2020

(87) PCT Pub. No.: WO2019/096607
PCT Pub. Date: May 23, 2019

(65) Prior Publication Data
US 2020/0293344 A1    Sep. 17, 2020

(30) Foreign Application Priority Data
Nov. 16, 2017  (EP) .................................. 17202012

(51) Int. Cl.
*G06F 9/455*   (2018.01)
*G05B 19/418*  (2006.01)
(Continued)

(52) U.S. Cl.
CPC ... *G06F 9/45529* (2013.01); *G05B 19/41845* (2013.01); *G06F 8/71* (2013.01);
(Continued)

(58) Field of Classification Search
CPC ........ G06F 8/71; G06F 9/4401; G06F 9/4406; G06F 9/45529; G06F 9/546; G06F 9/44526; G05B 19/41845; G05B 2219/31372
See application file for complete search history.

(56) References Cited

U.S. PATENT DOCUMENTS 6,591,295 B1 * 7/2003 Diamond ................ G06F 16/40
                                            709/217
7,155,490 B1  12/2006 Malmer et al.
(Continued)

FOREIGN PATENT DOCUMENTS

| CN | 1757015 A | 4/2006 |
| CN | 1757216 A | 4/2006 |

(Continued)

OTHER PUBLICATIONS

Manufacturing execution system, Wikipedia, 2016, 5 pages, [retrieved on Apr. 25, 2023], Retrieved from the Internet: <URL:http:// https://web.archive.org/web/20160917233845/https://en.wikipedia.org/wiki/Manufacturing_execution_system>.*

(Continued)

*Primary Examiner* — Geoffrey R St Leger
(74) *Attorney, Agent, or Firm* — Laurence A. Greenberg; Werner H. Stemer; Ralph E. Locher

(57) ABSTRACT

A method for operating at least a container application and a component application. The container is an application hosting the component application. The method includes the following: providing a library of code files, a bootloader and further executable code files, wherein the component creates a probing message to the container application, and the container creates a response message containing references to code files to be loaded by the component.

14 Claims, 1 Drawing Sheet

(51) Int. Cl.
*G06F 8/71* (2018.01)
*G06F 9/4401* (2018.01)
*G06F 9/445* (2018.01)
*G06F 9/54* (2006.01)

(52) U.S. Cl.
CPC ........ *G06F 9/4401* (2013.01); *G06F 9/44526* (2013.01); *G05B 2219/31372* (2013.01); *G06F 9/4406* (2013.01); *G06F 9/546* (2013.01); *Y02P 90/02* (2015.11)

(56) References Cited

U.S. PATENT DOCUMENTS

| | | | |
|---|---|---|---|
| 7,233,830 B1 | 6/2007 | Callaghan et al. | |
| 7,409,674 B2 | 8/2008 | Shenfield et al. | |
| 8,719,388 B2* | 5/2014 | Giusti | G06F 8/60 709/222 |
| 9,398,462 B1* | 7/2016 | Delker | H04W 4/60 |
| 9,542,370 B2* | 1/2017 | Park | G06F 40/143 |
| 9,871,873 B2* | 1/2018 | Klinger | H04L 67/02 |
| 10,416,992 B2* | 9/2019 | Anderson | G06F 8/71 |
| 2006/0212514 A1 | 9/2006 | Saillet | |
| 2007/0101322 A1* | 5/2007 | Muschett | G06F 9/44526 715/234 |
| 2007/0293952 A1 | 12/2007 | Callaghan et al. | |
| 2009/0271501 A1 | 10/2009 | Shenfield et al. | |
| 2010/0250568 A1* | 9/2010 | Giusti | G06F 8/60 707/758 |
| 2010/0318989 A1* | 12/2010 | Dureau | G06F 16/245 707/769 |
| 2011/0289513 A1* | 11/2011 | Degirmenci | G06F 9/542 719/313 |
| 2012/0210333 A1 | 8/2012 | Potter et al. | |
| 2013/0219368 A1 | 8/2013 | Carteri et al. | |
| 2013/0246266 A1* | 9/2013 | Coleman | G06Q 30/0641 705/44 |
| 2013/0311875 A1* | 11/2013 | Pappas | G06F 40/143 715/234 |
| 2014/0047413 A1* | 2/2014 | Sheive | G06F 8/30 717/110 |
| 2014/0053107 A1* | 2/2014 | Patel | G06F 3/0482 715/840 |
| 2014/0068414 A1* | 3/2014 | Park | G06F 40/143 715/234 |
| 2015/0128021 A1* | 5/2015 | Hewett | G06Q 10/10 715/234 |
| 2015/0212504 A1 | 7/2015 | Eckl et al. | |
| 2016/0150028 A1* | 5/2016 | Klinger | H04L 67/10 709/217 |
| 2017/0068527 A1* | 3/2017 | Wang | G06F 8/61 |
| 2017/0220011 A1 | 8/2017 | Hart et al. | |
| 2019/0095196 A1* | 3/2019 | Anderson | G06F 8/71 |

FOREIGN PATENT DOCUMENTS

| | | |
|---|---|---|
| CN | 1835507 A | 9/2006 |
| CN | 102511037 A | 6/2012 |
| CN | 104216700 A | 12/2014 |
| CN | 104793946 A | 7/2015 |

OTHER PUBLICATIONS

Manufacturing operations management, Wikipedia, 2016, 4 pages, [retrieved on Apr. 25, 2023], Retrieved from the Internet: <URL:http://https://web.archive.org/web/20161124033234/https://en.wikipedia.org/wiki/Manufacturing_operations_management>.*
Anonymous: "HTML5 Web Messaging", XP055468748, retrieved from the Internet: URL:https://www.w3.org/TR/webmessaging/, retrieved on Apr. 19, 2018, p. 1, 15, 17; 2015.

* cited by examiner

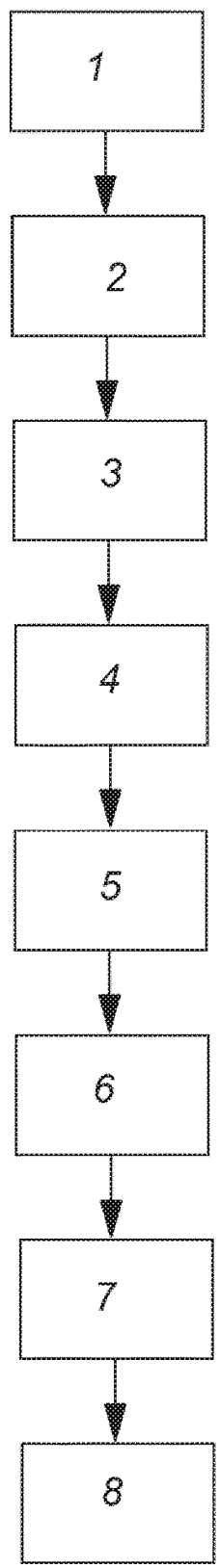

METHOD FOR RECIPROCALLY INTEGRATING APPLICATIONS, IN PARTICULAR WEB APPLICATIONS

BACKGROUND OF THE INVENTION

Field of the Invention

The invention relates to the integration of applications, in particular web applications, with each other.

Within industry, for example in the field of industrial management or machinery management, it is more and more necessary to integrate different applications, for example one from a client side and one provided by a service provider. In industry, platforms have been implemented that promote interoperability between users' and providers' applications, e.g. the "Siemens Web Application Collaboration" (SWAC), providing an interoperable mechanism for the integration, as well as a JavaScript framework that shall ease the process of hosting other parties' applications (generally this kind of application has a "container" role) or making some applications hostable (these kind of applications have "components" role). Applications can use the technology stack of their choice, are decoupled via iframe (inline frame) (which enforces isolation through the browser). Since container and components are usually deployed on completely separated webservers, they only interact at runtime.

Non-limiting examples of industrial software to which the present invention can be applied are Manufacturing Execution System (MES) and Manufacturing Operation Management (MOM). Most recently, the term MOM is more and more used to replace the term MES. Those systems can usually comprise software used as component or act as component in the sense above explained.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens AG offers a broad range of MES/MOM products under its SIMATIC® IT product family.

Anyway, as told before, MES/MOM systems are only an example of industrial software to which the invention applies, and they can also act as container application, if required.

Integration of two applications is prone to the following problems.

The first is due to possible different deployment and release cycles of the individual applications. As a result there might be different versions of the programming tools used for interoperability (e.g. JavaScript kits), leading to version conflicts might occur; component and container should preferably use the same version for best interoperability, even when the public API would be stable.

A further problem is due to limitation that the web pose to code exchanges between programs, in particular to container-specific code to be provided to the hosted components.

According to the web platform, component and container can only interact via contracts, i.e. exchanging text (of type string) via HTML5 Messaging Module. As a result, it is impossible to exchange business logic, code or types (in terms of types relying on an individual implementation with constructor etc.)

Also so called "extensions", can have again a defined public API (application programming interface), but need container-specific code to be executed in the context of the application with the "component" role.

In both cases, the container wants to provide code to be executed by the hosted "component" application, but a browser's security sandbox will usually prevent a web page from manipulating another web page, especially injection of code is prevented because of the cross-origin-policy.

Other solutions foresee, such as dependency injection frameworks or lazy module loaders, are well-known from different domains and available in different technologies. Nevertheless, the concepts known from any of the existing solutions cannot be applied to web applications that operate in distinct and clearly separated iframes.

Other web frameworks dealing with dynamic modules (e.g. Component Factory Load from Angular 2) do not deal with isolation and applications deployed with different technology stacks on separate back-ends.

US 2017/220011 A1 discloses a platform composed out of web applications, in particular regarding authentication and relying on a backend; it does not disclose how a boot phase is implemented.

Also according to US 2007/293952 A1 entire components must be loaded, and the specific problems relating to browser isolation are not considered.

US 2015/212504 relates to web integration, just mentioning generic features and not dealing with bootstrapping of components.

Thus, no satisfactory solution deals with restriction to code injection, in particular to iframe-caused web-specific issues.

SUMMARY OF THE INVENTION

The above-mentioned problems have now been solved by a method for operating at least a container application and a component application said container being an application hosting said component application, the method comprising: providing a library of code files, a bootloader and further executable code files, wherein the component creates a probing message to the container application, and the container creates a response message containing references (as URLs) to code files to be loaded by the component. According to a preferred embodiment, messages are created according to the available means on the web platform, preferably the HTML5 Messaging Module. Messages can be interpreted by a framework and can be used to trigger events, such as the retrieving and loading of code files from a library.

The library is preferably a JavaScript library, which can be shipped as an archive (no installation is required) and can contain bootloaders, a database and a further container file.

The file version can preferably be added as first line on each js file, but may also be available in code while developing with the kit to allow additional check or custom logic.

The container file may preferably contain all the features that are used only by the container application, e.g. capability of hosting components, their lifecycle and relationship between components and/or container and service publishing.

The database is referenced preferably only by the container application, and contains the core engine features. Those can be injected into the component application during its boot phase. Those features can permit communication across different domains, bidirectional communication methods, eventing, services, and premises.

Proxy with synchronous and asynchronous method support.

The bootloader has preferably no features, but the sole task during boot phase to contact the availability of code files by the container and receive and start the functionalities, or, alternatively to stop the boot phase.

BRIEF DESCRIPTION OF THE DRAWING

The invention will now be better illustrated with the aid of the appended FIGURE, which shows a schematic flow diagram of a method according to the invention.

DETAILED DESCRIPTION OF THE INVENTION

According to a preferred embodiment, the method can comprise:

creating a framework 2, capable of requesting component applications.

According to an embodiment of the invention, the method comprises:

providing a container application capable of hosting component application with a library of code files to be run upon request of the component applications;

providing component applications with a bootloader capable of generating messages capable of triggering the loading of one or more of said code files.

Preferably, the bootloaders implement a very simple handshake protocol only.

According to an embodiment, a container application will create 2 at least a framework on a component manager. The framework triggers the loading of component applications 3 available to the component manager and provided with bootloaders.

The component application demands, according to its needs, actual loading of the code files provided by triggering a bootloader. The code files can comprise extensions to be provided by the container application.

According to a preferred embodiment, a predefined probing message is generated 4 requesting the availability of requested code files, as well as extensions and other data, such as the version, hints and authorisations. If the request can be handled, i.e. the container application is provided with the requested code, a predefined response message is created 5, comprising URLs (Uniform Resource Locators) that suits component application's needs best, so that the URLs are made available to the component application.

Furthermore, the response message contains URLs for all extensions to be loaded by the component application and the version.

Both container and component application can reject the version of the component and container application and terminate boot phase, if not compatible.

The bootloader will create 6 a script tag for each URL, capable of making the browser load and execute 7 the relevant code.

Once all URLs have been resolved i.e., the files has been successfully loaded and the code has been executed, the needed functions (in general APIs) are available to the component application; the success state can preferably be notified 8 towards the container application.

According to a preferred embodiment, the code and the scripts are in a dynamic programming language, such as JavaScript, which is a more preferred language. By using said languages, it is sufficient that code and objects are available only at runtime, which eases the task of dynamically loading code because no preceding compile-time step is necessary.

According to a further embodiment, instead of providing an URL which points to the file that has to be loaded and executed by the application with the "component" role, the container application, through the framework can provide a so called "data-URL", which can hold content directly instead of a resource identifier, such as a script. This way the code is provided without the need to load the resource on its own. Instead the file is encoded (e.g. base 64 encoded) and can be added to a script-tag immediately, while the browser will treat it like a regular file. This is especially useful for native "container" applications hosting web applications, since they do not have to provide the server capabilities but can provide the file through the message-based protocol only.

The invention brings about further advantages.

A component application does not have to hold available a whole set of interoperability functionality, but it needs only the bootloader, while the code implementing the framework is completely provided by the container application. As a container and component always fit together.

Code injection via URL, where the application loads itself the resource needed is safe in terms of a browser's cross-origin-policy.

Injection of different pieces of code allows the container application to determine which functionality is performed by the component application and which by the container application. As an example, a service that can be called by a component application may result in lots of marshalling across the framework boundary. If these kinds of mass operations can be handled in the component application's context or if the service can introduce some kind of cache into the component application's context, the performance loss for marshalling might be reduced drastically. In general, a container application is more flexible with regard to optimisation.

By following in the creation of the code an unique module pattern such as JavaScript module pattern (or comparable) and generating unique predefined namespace to be injected, (to be provided with the code from the URL during injection) the bootloader can either skip injection, in order to not inadvertently override existing functionality (e.g.: when a component application needs to work with a particular code version, or inject the code and check if the operation has been successful.

LIST OF REFERENCE SIGNS

1 Start
2 Create framework on component manager

3 Loading of component applications
4 Probing message generation
5 Response message generation
6. Creation of script tag to load code
7 Loading of requested code
8 Notification to container application

The invention claimed is:

1. A method for operating a container application and a component application, wherein the container application is an application hosting the component application, the method comprising:
  providing a library including code files and a bootloader, wherein the code files include extensions;
  generating with the component application, a probing message to the container application; and
  generating with the container application, a response message containing references to code files including at least one of the extensions to be loaded by the component application;
  wherein the component application and the container application are deployed on separated Web servers;
  wherein the references to the code files are Uniform Resource Locators; and
  wherein the bootloader is configured for creating script tags for activating the URLs, capable of making a browser load, and execute one or more of the code files.

2. The method according to claim 1, wherein the component application is a Manufacturing Execution System or a Manufacturing Operation Management application.

3. The method according to claim 1, which comprises creating messages according to means available on a web platform.

4. The method according to claim 3, wherein the messages are generated with an HTML5 Messaging Module.

5. The method according to claim 1, which comprises generating the probing message to request explicitly functionality to be provided by the container application.

6. The method according to claim 1, wherein the probing message is generated requesting an availability of a requested code file and, if available, providing with the container the response message, comprising URLs relating to code files, so that the URLs are made available to the component application.

7. The method according to claim 6, wherein the probing message requests other data selected from the group consisting of a version of the code, hints, and authorizations.

8. The method according to claim 1, wherein at least a part of the URLs are data-URLs.

9. The method according to claim 1, wherein code and code files handled by the bootloader are coded in a dynamic programming language.

10. The method according to claim 1, wherein code and the code files are in JavaScript.

11. The method according to claim 1, wherein the response message, which is generated with the container application, also includes a version of the one of the extensions to be loaded by the component.

12. The method according to claim 1, wherein the bootloader generates messages triggering a loading of the code files including at least one of the extensions to be loaded by the component application.

13. The method according to claim 1, which comprises: triggering, by the component application, the bootloader to request actual loading of the code files.

14. The method according to claim 1, wherein the probing message is generated requesting an availability of a requested code file and, if available, providing with the container the response message, comprising URLs relating to code files, so that the URLs are made available to the component application; and wherein the probing message also requests a version of the code.

* * * * *